Feb. 24, 1931.  A. E. H. BARILI  1,793,453
SPRING NUT LOCK WASHER
Original Filed May 9, 1928
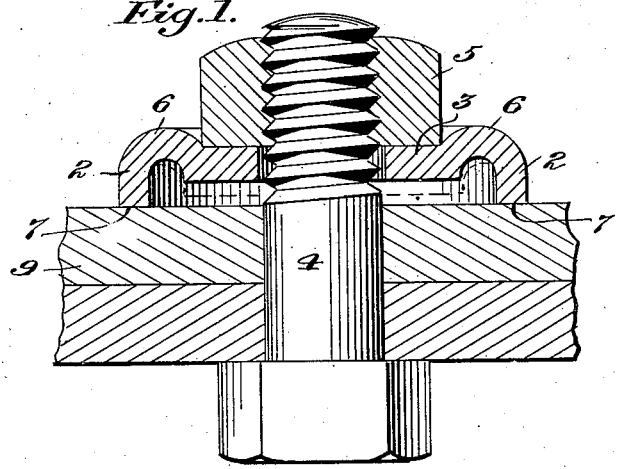
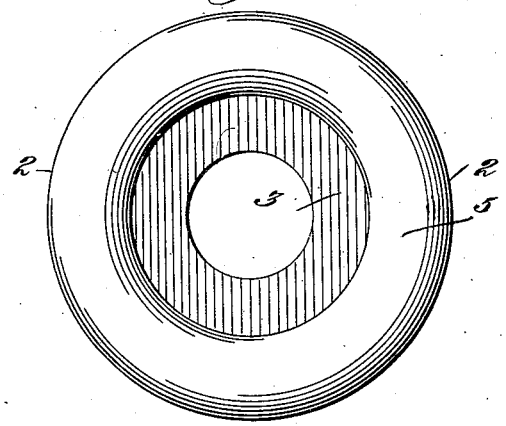
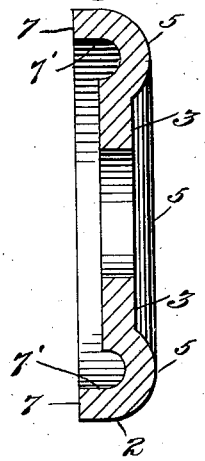
Inventor:
Arthur E. H. Barili,
By Jas. L. Skidmore
his Att'y.

Patented Feb. 24, 1931

1,793,453

UNITED STATES PATENT OFFICE

ARTHUR E. H. BARILI, OF LOS ANGELES, CALIFORNIA

SPRING NUT-LOCK WASHER

Application filed May 9, 1928, Serial No. 276,302. Renewed August 11, 1930.

This invention relates to an improved and novel spring nut lock washer, said washer being so constructed that when the securing nut is adjusted into contact therewith to the usual 5 degree of tightness in order to properly secure it in place, there remains some spring to the washer, hence when applied to a rail joint the bolt will not stretch, since the spring action will yield under the strain of expansion, and when the joint contracts the counter resistance will be so intense that the joint or any other device to which it may be attached will return to its original set condition due to the immense strength of this type of spring lock washer.

The prime object of the invention is to provide a simple, economical, durable and thoroughly efficient spring nut lock washer formed from a single piece of suitable spring steel adapted to effectively prevent the securing nut from loosening or unscrewing when subjected to undue strains and vibrations of various kinds.

Another object of the invention is to so construct my improved washer of the non-split type that it will normally be of circular formation, but when the space is limited, it may be flattened at one or both sides thereof, thus taking up less area; that it will have constant tension against the nut and the other member with which it is adapted to contact, and that it will prevent the snapping of the securing bolts, which is usually caused by expansion and contraction during sudden and extreme changes of temperature.

The foregoing and such other objects as may appear from the ensuing description are attained by the construction, arrangement and location of the washer hereinafter more fuly described, illustrated by the accompanying drawings, and particularly pointed out in the claims appended hereto, it being understood that slight changes in the precise shape, proportions and minor details of construction may be resorted to without departing from the spirit or sacrificing any of the advantages of the invention.

In the accompanying drawings forming a part of this specification it will be seen that:

Figure 1 is a sectional elevation of the washer embodying my invention showing its application when in use.

Figure 2 is a top plan of the washer detached.

Figure 3 is a cross-section of the washer shown in Fig. 2.

In the embodiment of my invention as illustrated it will be seen that the numeral 2 designates a non-split type of washer which is preferably formed by a stamping press from a single piece or sheet of suitable spring steel, said washer being normally formed in circular or annular formation having a flattened central member or portion 3, provided with a central opening therethrough to receive a securing bolt 4; and upon the outer face of said flattened portion is seated a securing nut 5, which nut is adjusted on the screw-threaded portion of said bolt 4.

Extending laterally from the flattened member or portion 3 is an outer arch-shaped portion 6 terminating with a smooth inner peripheral edge 7, said edge extending inwardly a suitable distance beyond the said flattened portion 3.

In applying the nut to this particular type or construction of washer, the said nut is preferably adjusted on the bolt with sufficient force to cause the flattened portion of the washer to substantially contact with the outer face of the member 9, against which the washer is seated, and then by releasing the nut about one thread cause the flattened portion of the washer to assume substantially the position shown by the dotted lines in Fig. 1 of the drawings, for the purpose of allowing for the usual contraction and expansion of the bolt, and thus prevent accidental snapping or severing of the bolt caused by varying temperatures.

The dotted lines shown in Fig. 1 of the drawings designate the shape of the washer when sufficiently depressed to lock the nut in position. It is important to note that the entire central portion 3 of the washer remains flat and continues to afford the nut a perfect bearing. It will also be observed that the said dotted lines curve upwardly at each end portion thereof gradually approaching and finally coinciding with the inner surface 7' of the circular flange 7, substantially at the point where this curve terminates in the straight portion of the inner surface 7'. It will be clearly evident that the central portion moves straight up and down without distortion; that the central portion is depressed without thereby spreading the outer circular flange 7, and that the intermediate semi-circular portion of the washer is sufficiently elastic to adjust itself to the rise and fall of the center portion.

This particular construction of washer constitutes a departure from all other washers of a similar type, since in all such washers a spreading of the outer rim takes place, and experience has shown, that such spreading of the outer rim is detrimental to the functions sought to be attained, for the reason that the contact surface between the washer and its clamping surface is thereby destroyed. Further, it has also been discovered, in such washers, that the inner portion, against which the nut is brought to bear, changes its shape, thus destroying this bearing surface.

It will be understood that this construction of washer may be formed in any suitable or desirable manner, and of any suitable or required dimensions, depending upon the use for which it is intended to be employed.

Having thus described my invention what I claim and desire to secure by Letters Patent is:

1. An annular spring nut lock washer formed from a single piece of resilient material having an intermediate annular flattened and depressed central portion, and an arch-shaped portion extending upwardly, then outwardly, and then inwardly beyond the flattened portion, said flattened portion having a central opening formed therethrough for the reception of a bolt.

2. An annular washer formed from a single piece of resilient material, said washer having an intermediate annular flattened and depressed central portion for the reception of a securing nut, and an arch-shaped portion extending upwardly and outwardly beyond the outer face of the flattened portion and then inwardly beyond the inner face of the flattened portion, and terminating with a flat smooth inner peripheral edge portion said flattened portion having a central opening formed therethrough for the reception of a bolt.

3. A spring nut lock washer of annular formation pressed from a single piece of resilient material, and formed with an intermediate annular flattened and depressed central portion, an arch-shaped portion extending upwardly and laterally beyond the flattened portion, said arch-shaped portion terminating with a straight flat end portion, said flattened portion having an opening formed centrally therethrough for the reception of a bolt.

ARTHUR E. H. BARILI.